Figure 4:
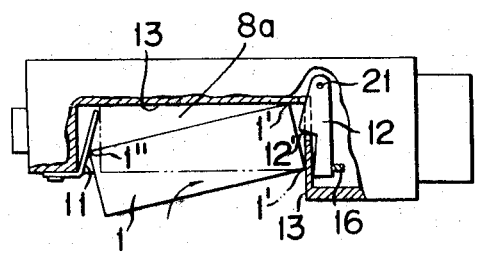

United States Patent

[11] 3,626,829

| [72] | Inventors | Yozo Iida<br>Tokyo;<br>Yoshihisa Katsuyama, Yokohama-shi, both of Japan |
|---|---|---|
| [21] | Appl. No. | 764,256 |
| [22] | Filed | Oct. 1, 1968 |
| [45] | Patented | Dec. 14, 1971 |
| [73] | Assignee | Nippon Kogaku K.K.<br>Tokyo, Japan |
| [32] | Priority | Oct. 13, 1967 |
| [33] | | Japan |
| [31] | | 42/65592 |

[54] AUTOMATIC FILM-SENSITIVITY SETTING DEVICE FOR A CAMERA HAVING A BUILT-IN EXPOSURE METER
5 Claims, 9 Drawing Figs.

[52] U.S. Cl. .................................................. 95/31 FS, 95/10 C, 352/72
[51] Int. Cl. .................................................. G03b 19/18
[50] Field of Search ........................................ 95/10 C, 31; 352/72, 78, 141

[56] References Cited
UNITED STATES PATENTS

| 3,266,397 | 8/1966 | Kremp et al. ............... | 95/31 FS |
| 3,410,186 | 11/1968 | Kaneko ....................... | 352/72 X |
| 3,410,187 | 11/1968 | Kaneko ....................... | 95/10 C |
| 3,434,782 | 3/1969 | Kancko ........................ | 352/72 |
| 3,461,782 | 8/1969 | Katsuyama ................. | 352/72 X |
| 3,464,334 | 9/1969 | Wilharm et al. ............. | 352/72 X |
| 3,477,355 | 11/1969 | Kinder .......................... | 95/10 C |

Primary Examiner—Joseph F. Peters
Attorney—Anton J. Wille

ABSTRACT: An automatic film-sensitivity setting means is provided for a camera having a built-in exposure meter and using a film cartridge. The film cartridge is formed with a positioning member which mates with a positioning member in the camera body, and is also formed with a film sensitivity determining member spaced from the cartridge positioning member in accordance with the sensitivity of the film loaded into the cartridge. A film-sensitivity sensing pin within the camera and interlocked with a variable resistance element in the exposure meter circuit is movable by the insertion of the cartridge into the camera body and then permitted to abut the sensitivity member of the cartridge to vary the resistance characteristics of the exposure meter circuit in accordance with the positioning of the sensing pin.

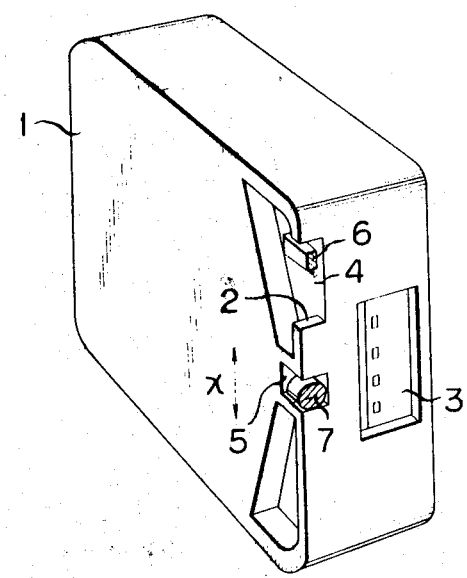
FIG. 1
FIG. 2
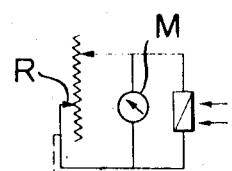
FIG. 3
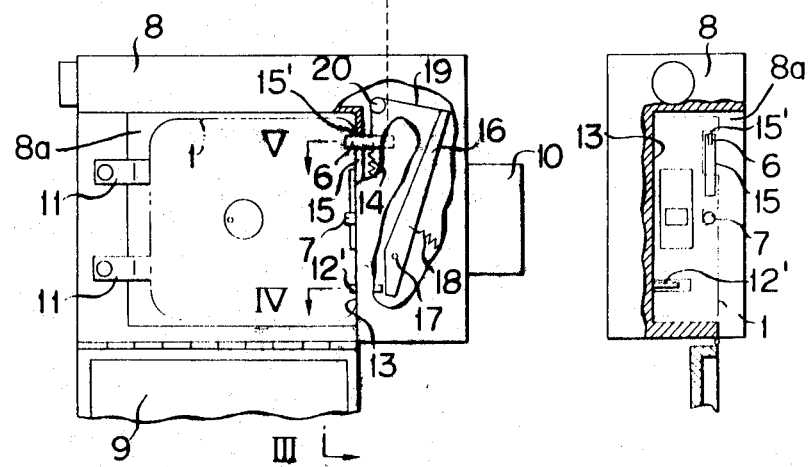

AUTOMATIC FILM-SENSITIVITY SETTING DEVICE FOR A CAMERA HAVING A BUILT-IN EXPOSURE METER

This invention relates to an automatic film-sensitivity setting means for a camera having a built-in exposure meter and using loaded film cartridges which are inserted into the camera body. In one conventional arrangement for providing an automatic setting of the film sensitivity in an exposure meter circuit, the cartridge is provided with a convex or concave signal member for indicating the speed of the film loaded into the cartridge. When the cartridge is inserted a detecting member engages the signal member for setting the film speed. In such arrangement there is a possibility of cartridge misalignment.

Further, the spring force for the detecting member and for holding the cartridge in place work against each other so that the automatic setting of the film speed could be improperly operated.

An object of the present invention is to provide an automatic film-sensitivity setting means for a camera wherein the film cartridge is provided with sensitivity signal member dimensional or positioned from a point of reference to indicate the particular speed of the film used, the insertion of the cartridge into the camera being the only requirement for adjusting the response characteristics of an exposure meter circuit in accordance with the film sensitivity.

In accordance with the present invention, the film cartridge is loaded from the side of the camera, the loading being essentially normal to the photographic axis of the camera. The sensing pin provided within the camera for engaging the sensitivity determining member on the film cartridge is so inserted that it is moved substantially normal to the direction in which the cartridge is loaded. This arrangement provides an accurate positioning of the cartridge within the camera so that the film is properly focused upon exposure and assures the correct positioning of the sensing pin to provide a correct film speed setting for the exposure meter.

The movement of the sensing pin to engage the sensitivity determining member of the cartridge is interlocked with the insertion of the cartridge by means of a lever and pulley arrangement, the insertion of the cartridge pivoting the lever to move the sensing pin to an extreme position to permit the full insertion of the cartridge. Through resilient means, the sensing pin is moved to a position determined by the sensitivity member of the cartridge after the cartridge is in position. Withdrawal of the cartridge after film exposure will cause the lever to pivot to permit removal of the cartridge without the necessity of releasing interlocks or detents for the sensing pin as in prior art devices.

Referring now to FIG. 1 of the drawings, a film cartridge of the type used in motion picture cameras, is illustrated formed with a shoulder or contacting surface 2 and an aperture or window 3 in the front wall for exposure of the film loaded into the cartridge. The cartridge 1 is provided with recesses or cut out portions 4 and 5 in one side of the cartridge, the recesses extending into the front wall, the shoulder 2 forming an edge for the recess 4 on the front wall. As will hereinafter appear, the recess 4 is adapted to receive a sensing pin 6 while recess 5 is adapted to receive a conventional positioning determining pin 7.

With reference now to FIGS. 2 riveted 5, a camera body 8 is formed with a recess or chamber 8a for receiving the film cartridge 1; a hinged cover 9 being provided to cover and seal the cartridge chamber. With the cartridge in position within the chamber, the film aperture 3 will be in alignment with a camera lens 10. To retain the cartridge within the chamber in its desired position, two L-shaped spring members 11 (FIGS. 4,5) are riveted to the camera body, the bias of the spring members moving the cartridge forwardly against the front chamber wall 13 so that the sensing pin 6 extends into the recess 4 and the position determining pin 7 fixed to the camera body and extending into the chamber, enters the recess 5 of the cartridge. Positioning the cartridge 1 within the chamber 8a as indicated by the dash-dotted line in FIG. 2 will pivot a lever 12 rotatably mounted on a shaft 21 in the camera body (FIG. 4). The lever 12 is formed with a step portion 12' which extends into the camera chamber.

The sensing pin 6 is vertically movable, and is interlocked as indicated by the dashed line in FIG. 2 with the film sensitivity determining resistance R of a built-in exposure meter M. The pin is biased by a spring 14 to engage the shoulder 2 on the film cartridge recess 4, the pin extending through slit 15 in the camera body. The sensing pin 6 is connected to a lever 16 pivoted to the camera body as at 17, and biased clockwise (FIG. 2) by a tension spring 18; the upper end of the lever 16 being connected by a wire or cable 19 and passing over a pulley 20 to the pin 6. It will be noted in FIGS. 3 and 4 that the lower end of the lever 16 abuts the stepped lever 12 so that the step portion 12' thereof projects into the chamber 8a for abutment by the he cartridge 1.

The elongated slit 15 provided in the camera body and through which the sensing pin 6 projects is of suitable length so that the pin may be moved vertically by the cable or wire 19 and the bias of spring 14. The upper edge 15' of slit 15 provides a limit stop for the sensing pin and is so determined that when the film cartridge is loaded into the camera body, the sensing pin pulled upwardly by cable 19 due to the bias of spring 18 will enter the recess or cutout portion 4 of the film cartridge. The length of the slit 15 is determined by the vertical distance X the recess shoulder 2 is from the axis the positioning pin 7 received in the recess 5 of the film cartridge. The length of the slit should be such that the sensing pin 6 will abut the shoulder 4 when the distance X is set at a minimum, as will hereinafter appear. The length of cable 19 is also determined in connection with the length of slit 15 and the minimum distance X so that the angular displacement of the lever 16 will permit entry of the sensing pin into the cutout portion 4 and abutment with the shoulder 2 when the distance X is at a minimum.

Figure 5:
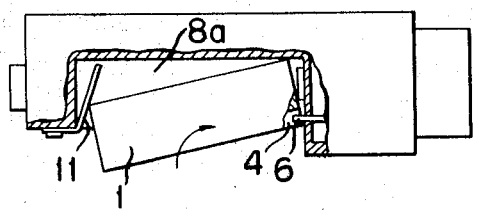
Figure 6:
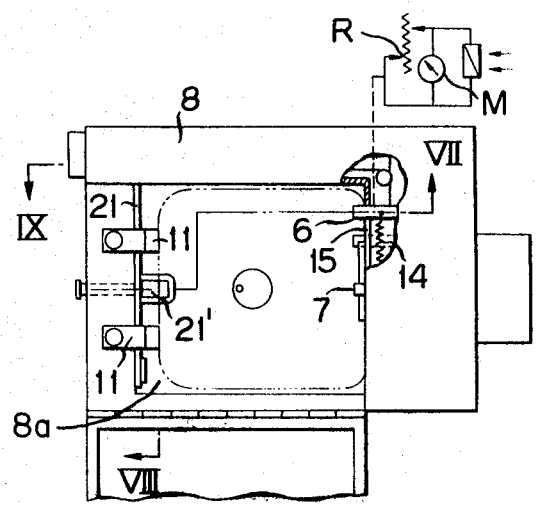
Figure 7:
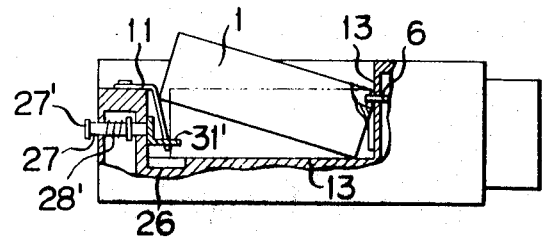
Figure 8:
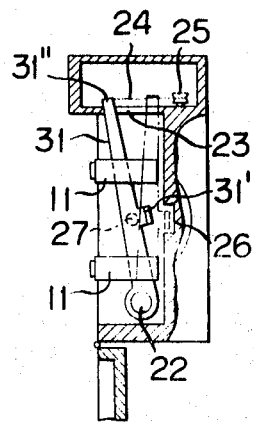
Figure 9:
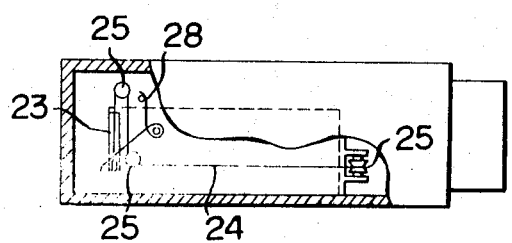

The dimensions of the film cartridge 1 are such that when the cartridge is loaded in the camera as indicated in FIGS. 4 and 5, the cartridge is tilted to permit the position determining pin 7 to enter the recess 4 and then snapped into the camera chamber against the resilience of the springs 11. The bias of the springs on the rear wall 1" of the cartridge will hold the aperture formed wall 1' of the cartridge against the front wall 13 of the cartridge chamber so that the film will be properly focused. With the cartridge in place, the wall 1' will abut the step portion 12' of the lever 12.

The film cartridge when the position illustrated in FIGS. 2 and by dot-dashed line in FIG. 4, will rotate the lever 12 counterclockwise and carry with it the lower end of lever 16 against the bias of the spring 18. The resultant counterclockwise rotation of the lever 16 will provide slack in the cable 19 permitting the spring 14 to move the sensing pin 6 downwardly to abut against the shoulder 2 of the film cartridge. Through the interlock with the film sensitivity determining resistance R of the exposure meter, the positioning of the sensing pin 6 by the shoulder 2 sets the proper film sensitivity factor into the exposure meter circuit. Upon removal of the film cartridge from the camera body, the tilting of the cartridge will release the step lever 12 to permit the lever 16 to be returned by spring 18, the clockwise rotation of the lever 16 pulling up on the cable 19 to move the sensing pin 6 to its original position.

A second embodiment of the invention is illustrated in FIGS. 6 through 9 wherein the same reference characters are used to designate the several elements already described in connection with the first embodiment of the invention.

Pivoted within the camera body on a shaft 22 is a lever 31 formed with a projection 31', the upper end 31" of the lever extending through a slit 23 into a camera body compartment. The upper end 31" of the lever is connected by a wire or cable 24 passing over a series of pulleys 25, to the sensing pin 6 described in connection with the first embodiment. The cable 24 is kept under tension by a spring 28 bearing against the upper and of the lever 31 and tending to hold the pin in its upper position against the tension of the spring 14. When the film cartridge 1 is loaded into the camera (FIG. 7), the lever 31 is rotated clockwise by abutment of the cartridge on lever projection 31' to the position illustrated by the phantom line in FIG. 8 so that the projection 31' on the lever enters a recess 26 (FIG. 7) formed in the camera body. The movement of the lever 31 upon insertion of the film cartridge corresponds to the maximum movement of the sensing pin 6, the slit 23 being of such length that there is no interference with the upper end of the lever.

A locking pin 27 is provided for the lever 31, the locking pin being biased inwardly by a coil spring 28' so that the inner end of the pin is abutted by the lever 31 when the lever is in the phantom line position. The locking pin 27 provides an automatic lock for the lever 31, the withdrawal of the locking pin knob 27' releasing the lever 31.

In loading the film cartridge into the camera, the recess 5 of the cartridge is aligned with the positioning determining pin 7 and the cartridge pressed down against the bias of the springs 11 in the manner described.

In inserting the cartridge, the lever projection 31' is engaged by the cartridge to rotate the lever 31 against the bias of spring 28 thereby raising the sensing pin 6 to permit the cartridge to be snapped into place. The pin 6 due to the force of the spring 14 will be lowered to abut the shoulder or contacting surface 2 of the film cartridge thereby setting the resistance value R of the exposure meter circuit in accordance with the film sensitivity. When the lever 31 is pivoted in the manner described, it moves out of the path of the locking pin 27 permitting the spring 28' to move the pin inwardly to lock the lever in the phantom line position in FIG. 8. Any excess displacement of the lever 31 will not interfere with the operation of the sensing pin due to the resilient tension of the cable.

When the film in the cartridge is exposed, the camera body is opened and the locking pin 27 pulled out. This releases the lever 31 to permit the spring 28 to pivot the lever and through the abutment of projection 21' to partially eject the cartridge from the camera body, the lever at the same time lifting the sensing pin 6 to permit complete withdrawal of the film cartridge.

We claim:

1. An automatic film-sensitivity setting device for a camera having a built-in exposure meter, the camera being adapted for cartridge-type film loading, the cartridge being provided with a signal portion positioned thereon to indicate the sensitivity of the film loaded therein, comprising
   a chamber within the camera housing and formed with a fixed portion for positioning the cartridge therein,
   a sensing member movably mounted in the camera housing,
   biasing means for biasing the sensing member in a direction to engage the cartridge signal portion when the cartridge is within said chamber,
   biased control means for controlling the sensing member and positionable from its biased position upon insertion of the cartridge into the camera chamber, said biased control means including a movable member having a portion thereof adapted to extend into the camera chamber for engagement by the cartridge upon insertion thereof into the chamber, a pivotable lever coacting with the movable member, and a spring biasing said pivotable lever against said movable member to extend said movable member portion into the camera chamber,
   means for interconnecting said lever and the sensing member, the bias of said lever spring being opposed to the bias of said sensing member biasing means, said lever in its biased position maintaining the sensing member in an extreme position against the bias of the sensing member biasing means and releasing said sensing member when said lever is moved upon insertion of the cartridge into the camera chamber to permit the sensing member to be biased by said biasing means into engagement with the signal portion of said cartridge,
   means of retaining the cartridge within the camera chamber including resilient means for biasing the cartridge into engagement with said fixed portion, the bias of said resilient means being in a direction transverse to the bias of said sensing member biasing means, and
   an exposure control element of the exposure member connected to said sensing member for adjustment in accordance with the position of the cartridge signal portion.

2. An automatic film-sensitivity setting device according to claim 1, wherein said interconnecting means includes a wire interconnecting said pivotable lever and said sensing member, said wire slackening to permit said sensing member biasing means to move said sensing member into engagement with the cartridge signal portion upon movement of said lever by said cartridge.

3. An automatic film-sensitivity setting device for a camera having a built-in exposure meter, the camera being adapted for cartridge-type film loading, the cartridge being provided with a signal portion positioned thereon to indicate the sensitivity of the film loaded therein, comprising
   a chamber within the camera housing and formed with a fixed portion for positioning the cartridge therein,
   a sensing member movably mounted in the camera housing,
   biasing means for biasing the sensing member in a direction to engage the cartridge signal portion when the cartridge is within said chamber,
   biased control means for controlling the sensing member and positionable from its biased position upon insertion of the cartridge into the camera chamber, said biased control means including a pivotable lever movable between two extreme positions, a spring biasing said pivotable lever to one extreme position, the bias of said lever spring being opposed to the bias of said sensing member biasing means, a projection on said lever, said projection being engaged by the film cartridge upon insertion thereof into the camera chamber when said lever is in said one biased position, the insertion of the film cartridge moving said lever to its other extreme position, 4. An automatic film-sensitivity setting device according to claim 3, wherein said pivotable lever is movable to said other extreme position in the same direction as the cartridge is moved upon insertion, the release of said spring biased detent permitting the biased lever spring to move said lever and cartridge preparatory to the removal of the cartridge from the camera chamber.

5. An automatic film-sensitivity setting device according to claim 4, wherein said interconnecting means includes a wire interconnecting said pivotable lever and said sensing member, said wire slackening to permit said sensing member biasing means to move said sensing member into engagement with the cartridge signal portion when said lever is moved to said other extreme position.

* * * * *

UNITED STATES PATENT OFFICE
CERTIFICATE OF CORRECTION

Patent No. 3,626,829            Dated December 14, 1971

Inventor(s) YOZO IIDA and YOSHIHISA KATSUYAMA

It is certified that error appears in the above-identified patent and that said Letters Patent are hereby corrected as shown below:

Column 4, line 47, after "extreme position,", insert

-- means for interconnecting said lever and the sensing member, said lever in its biased position maintaining the sensing member in an extreme position against the bias of the sensing member biasing means and releasing said sensing member when said lever is moved upon insertion of the cartridge into the camera chamber to permit the sensing member to be biased by said biasing means into engagement with the signal portion of said cartridge, a spring biased detent for holding said lever in the other extreme position, means for retaining the cartridge within the camera chamber including resilient means for biasing the cartridge into engagement with said fixed portion, the bias of said resilient means being in a direction transverse to the bias of said sensing member biasing means, and an exposure control element of the exposure meter connected to said sensing member for adjustment in accordance with the position of the cartridge signal portion. --

Signed and sealed this 13th day of June 1972.

(SEAL)
Attest:

EDWARD M. FLETCHER, JR.            ROBERT GOTTSCHALK
Attesting Officer            Commissioner of Patents